(12) United States Patent
Trainin et al.

(10) Patent No.: US 7,916,670 B2
(45) Date of Patent: Mar. 29, 2011

(54) APPARATUS AND METHOD OF BLOCK ACKNOWLEDGEMENTS WITH REDUCED RECIPIENT STATE INFORMATION

(75) Inventors: Solomon Trainin, Haifa (IL); Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/387,044

(22) Filed: Apr. 27, 2009

(65) Prior Publication Data

US 2009/0213767 A1    Aug. 27, 2009

Related U.S. Application Data

(63) Continuation of application No. 11/171,753, filed on Jun. 29, 2005, now Pat. No. 7,535,858.

(51) Int. Cl.
*H04J 1/16* (2006.01)
*H04L 12/56* (2006.01)

(52) U.S. Cl. .................. 370/282; 370/230; 370/252

(58) Field of Classification Search .............. 370/252, 370/282, 230

See application file for complete search history.

(56) References Cited

U.S. PATENT DOCUMENTS

| | | | |
|---|---|---|---|
| 5,684,791 | A | 11/1997 | Raychaudhuri et al. |
| 7,385,976 | B2 | 6/2008 | Gu et al. |
| 7,474,676 | B2 | 1/2009 | Tao et al. |
| 7,535,858 | B2 | 5/2009 | Trainin et al. |
| 7,551,583 | B1 * | 6/2009 | Gazzard .................. 370/331 |
| 2006/0034247 | A1 | 2/2006 | Gu et al. |
| 2006/0034274 | A1 | 2/2006 | Kakani et al. |
| 2006/0056443 | A1 | 3/2006 | Tao et al. |
| 2006/0107166 | A1 | 5/2006 | Nanda |
| 2006/0268886 | A1 | 11/2006 | Sammour et al. |

FOREIGN PATENT DOCUMENTS

EP    1810435 A2    7/2007

(Continued)

OTHER PUBLICATIONS

Draft Standard for Information Technology-Telecommunications and information exchange between systems-Local and metropolitan area networks-Specific requirements; Part 11: Wireless LAN Medium Access Control (MAC) and Physical Layer (PHY) specifications; Amendment: Enhancements for Higher Throughput, IEEE P802.11n/D2.00, Feb. 2007, 15 pages.

(Continued)

*Primary Examiner* — John Pezzlo
(74) *Attorney, Agent, or Firm* — Alan Pedersen-Giles

(57) ABSTRACT

An apparatus and method for block acknowledgements with reduced recipient state information are described. In one embodiment, the method comprises the storing of a receive state for a block of frames received during a transmission opportunity (TXOP) with an on-chip state memory. Once stored, an immediate block acknowledgement, including the receive state information, may be transmitted to an originator according to a block acknowledgement request (BAR) received during the TXOP. In the embodiments described, the BAR is received during the TXOP in which the block of data frames were transmitted to a recipient. In one embodiment, the recipient is free to discard the receive state information to free space within the on-chip system memory by requiring the originator to maintain the receive state information of blocks of data frames transmitted during TXOPs. Other embodiments are described and claimed.

16 Claims, 7 Drawing Sheets

FOREIGN PATENT DOCUMENTS

| WO | 0137473 A1 | 5/2001 |
|---|---|---|
| WO | 2005015812 A1 | 2/2005 |
| WO | 2007/002874 A1 | 1/2007 |

OTHER PUBLICATIONS

International Preliminary Report on Patentability and Written Opinion for PCT/US2006/025477, Jan. 17, 2008.

PCT International Search Report for PCT/US2006/025477, Nov. 3, 2006.

Ayanoglu, E., et al., "Airmail: a link-layer protocol for wireless networks", ACM, New York, NY, US, vol. 1, No. 1, Feb. 1, 1995, 33 pages.

Brown, G. M., et al., "Block acknowledgement: Redesigning the window protocol", Computer Communication Review, ACM, New York, NY, US, vol. 19, No. 4, Sep. 1, 1989, pp. 128-135.

Office Action Received for Chinese Patent Application No. 200680023340.X, issued on Apr. 28, 2010, 6 Pages of Chinese Office Action, and 10 Pages of English Translation.

Examination Report Received for United Kingdom Application No. 0721285.5, mailed on Jul. 13, 2009, 2 Pages.

* cited by examiner

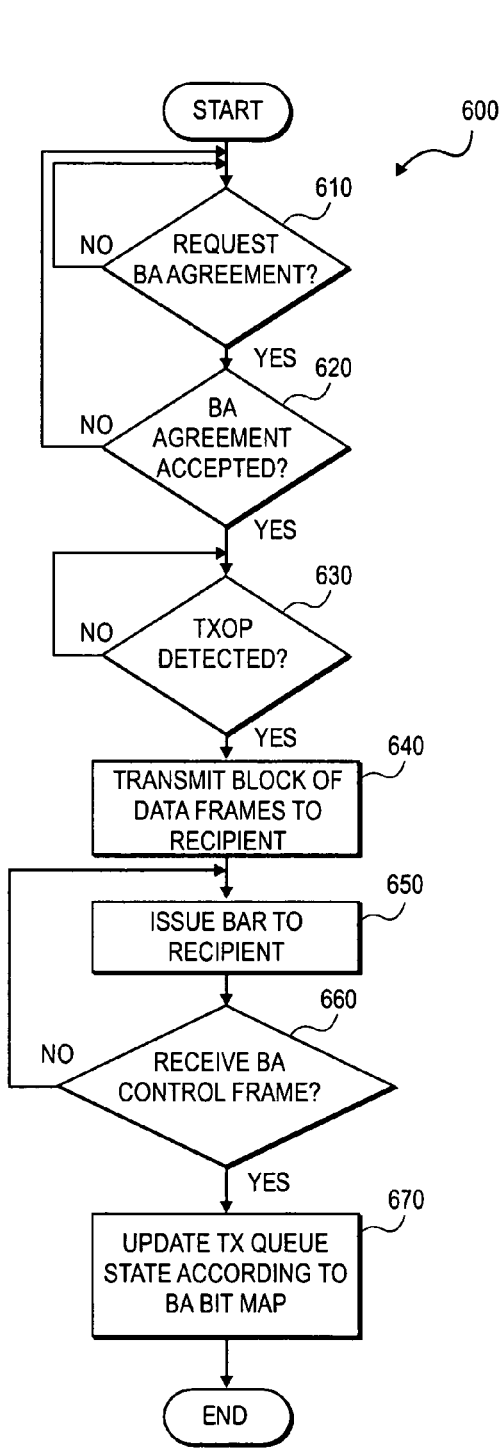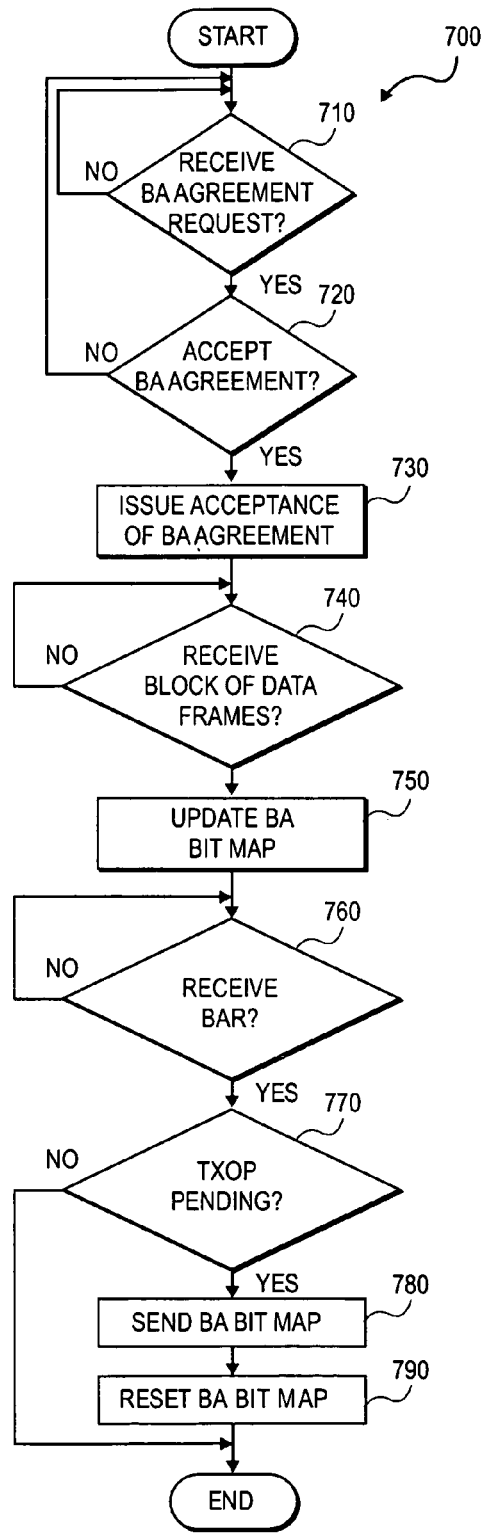
FIG. 8
FIG. 9

APPARATUS AND METHOD OF BLOCK ACKNOWLEDGEMENTS WITH REDUCED RECIPIENT STATE INFORMATION

CROSS-REFERENCE TO RELATED APPLICATIONS

This application is a continuation of U.S. patent application Ser. No. 11/171,753, filed Jun. 29, 2005, the entire disclosure of which is hereby incorporated by reference.

FIELD

One or more embodiments relate generally to the field of wireless communications. More particularly, one or more of the embodiments relate to a method and apparatus of block acknowledgements with reduced recipient state information.

BACKGROUND

Any Wireless Local Area Network (WLAN) device that supports an Institute of Electrical and Electronics Engineers (IEEE) 802.11 Standard (e.g., IEEE Std. 802.11-1997, 802.11a, 802.11e, etc.) includes two main parts: 1) a physical (PHY) layer signaling control device; and 2) a medium access control (MAC) device. The function of the PHY device is to transfer data packets over the air interface. Among other things, the function of the MAC device is to fairly control access to the shared air interface.

The minimal MAC protocol consists of two frames: 1) a frame sent from a transmitter to a receiver; and 2) an acknowledgement (ACK) from the receiver that the frame was received correctly. If a transmitter has multiple packets to send to the receiver, some versions of the 802.11 Standard require the transmitter to wait for an ACK after transmission of each packet. In addition, the transmitter must wait for a particular time interval, referred to as the Interframe Space (IFS), after receiving the ACK and before transmitting the next packet.

Other versions of the 802.11 Standard (e.g., IEEE Std. 802.11e) support transmission of packets with selective acknowledgement. This feature is referred to as "Block ACK." The Block ACK feature enables the transmitter to send the next packet to the same receiver without necessarily waiting for an ACK. Instead, after negotiating for access to the air interface, the transmitter sends the first packet, waits an interframe space (IFS) after the end of the first packet, and sends the next packet. After the transmitter has sent all of its packets to the receiver, the transmitter asks the receiver for a response, which indicates an ACK for all of the previously transmitted packets.

The Block ACK (BA) mechanism provided by the 802.11e Standard is referred to herein as the "immediate BA mechanism." The immediate BA mechanism provided by the 802.11e Standard is essential for realizing the throughput gains expected with 802.11n. However, the existing protocol imposes large memory requirements on devices that support this optional feature. The immediate BA protocol allows an originator to send a block data frames to a recipient and then request an acknowledgement for the block. To do this, the recipient maintains a scoreboard with a starting sequence number (SSN) and a bit marking each received data frame per each of established BA agreements. The process is under the control of the originator, which decides when the data frames are sent and when the block acknowledgement request (BAR) is sent to solicit a BA.

BRIEF DESCRIPTION OF THE DRAWINGS

The various embodiments of the present invention are illustrated by way of example, and not by way of limitation, in the figures of the accompanying drawings and in which:

FIG. 8 is flowchart illustrating a method for restricting the behavior of an originator to provide block ACKs with reduced recipient state information, in accordance with one embodiment.

FIG. 9 is a flowchart illustrating a method for responding to a block ACK request with a reduced recipient state information, in accordance with one embodiment.

DETAILED DESCRIPTION

A method and apparatus for block acknowledgements (ACK) (BA) with reduced recipient state information are described. In one embodiment, the method comprises the storing of a receive state for a block of frames received during a transmission opportunity (TXOP) with an on-chip state memory. Once stored, an immediate block ACK (BA), including the receive state information, may be transmitted to an originator according to a BA request (BAR) received during the TXOP. In one embodiment, the originator is required to issue the BAR during the TXOP in which the block of data frames were transmitted to a recipient. In one embodiment, the recipient is free to discard the receive state information to free space within the on-chip system memory by requiring the originator to maintain the receive state information of blocks of data frames transmitted during TXOPs.

System

Figure 1:
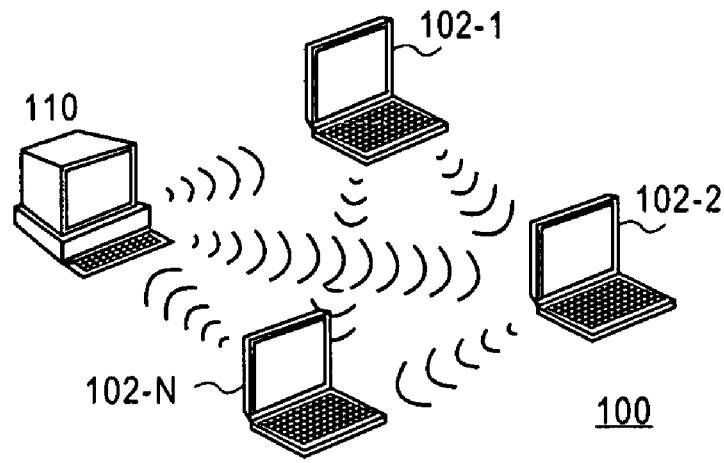
FIG. 1 is a block diagram illustrating a peer-to-peer wireless network configuration for providing block acknowledgements with reduced recipient state information, in accordance with one embodiment.
Figure 2:
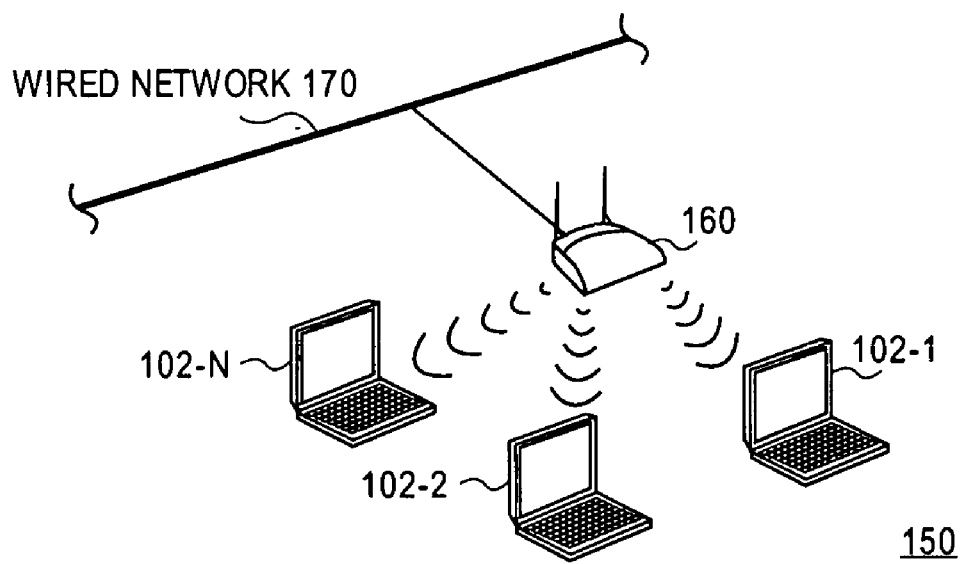
FIG. 2 is a block diagram illustrating a wireless network (WLAN) configuration for providing block acknowledgements with reduced recipient state information, in accordance with one embodiment.

FIG. 1 is a block diagram illustrating a peer-to-peer (ad-hoc) configuration for a wireless network 100, in accordance with one embodiment of the invention. FIG. 2 illustrates an infrastructure mode or basic service set (BSS) wireless local area network (WLAN) configuration 150, in accordance with one embodiment. In embodiments depicted in FIGS. 1 and 2, wireless networks 100 and 150 may be configured according to a "wireless protocol" including, but not limited to, IEEE 802.11a, 802.11b, 802.11c, 802.11e, 802.11g, 802.11n, 802.11i, HyperLan 2, or any other protocol for any point-to-point (ad-hoc) wireless link or network. In one embodiment, wireless clients 102, as shown in FIGS. 1 and 2, are configured to provide a block acknowledgement (ACK) (BA) with reduced recipient state information to reduce storage requirements of a recipient station, according to one embodiment.

As shown in FIG. 1, network 100 is configured according to an ad hoc mode as independent basic service set (IBSS). Representatively, two or more wireless clients 102 (102-1, ..., 102-N) are equipped with, for example, wireless adapter cards to communicate within wireless network 100. As illustrated in FIG. 2, in the infrastructure mode, each client 102 sends all communications to a WLAN access point (station) 160. As such, the clients 102 communicate with station 160, which acts as a bridge to resources of a wired network 170. Wired network 170 may implement a local area network (LAN) using an Ethernet protocol, Home Plug protocol, or the like.

As described herein, the term "wireless client" or "client" is used to refer to wireless devices including, but not limited to, personal computers including laptop computers, equipped with wireless adapter cards, as well as personal digital assistants (PDAs), appliances, and the like devices configured to communicate via a wireless communications medium such as, for example, radio frequency (RF) waves. Furthermore, as described herein, the term "wireless station" or "station" is used to refer to devices including, but not limited to, wireless base stations, wireless access points (AP), computers such as server computers, personal computers, laptops, PDAs, or like devices configured to restrict access to stored information contained therein or to an attached wired network.

Figure 3:
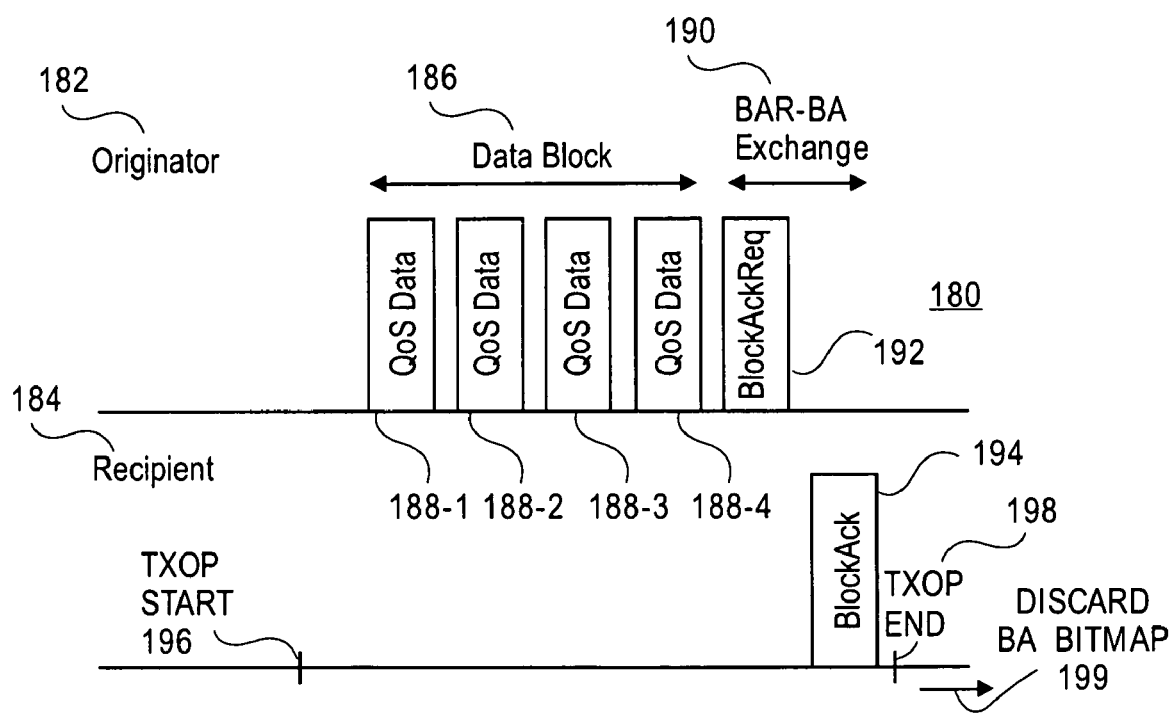
FIG. 3 is a block diagram illustrating an immediate block acknowledgement (ACK) (BA) with reduced recipient state information, in accordance with one embodiment.

FIG. 3 illustrates a block acknowledgement (BA) sequence according to an immediate BA mechanism with a reduced recipient state information, in accordance with one embodiment. However, there are two types of BA mechanisms: immediate and delayed. Immediate BAs are suitable for high-bandwidth, low latency traffic, while delayed BAs are suitable for applications that tolerate moderate latency. As described herein, the station with data to send using the BA mechanism, is referred to as the "originator" and the receiver of that data as the "recipient."

In one embodiment, the immediate BA mechanism illustrated in FIG. 3 may improve channel efficiency by aggregating several acknowledgements (ACK) into one frame. The immediate BA mechanism, as shown in FIG. 3, is essential for realizing the throughput gains expected with IEEE 802.11n Standard. However, the immediate BA mechanism as it is defined in IEEE 802.11e imposes large memory requirements on recipients that support this feature. As shown in FIG. 3, the immediate BA mechanism allows the originator 182 to send a block 186 of data frames 188 (188-1, 188-2, 188-3, 188-4), such as, for example, quality of service (QoS) data to recipient 184 and then perform BA-BAR exchange 190 to receive a BA 194 for the block 186.

As described herein, a "BA-BAR exchange" may refer to the issuance of a BA request (BAR) (e.g., BlockAckReq 192) by an originator (e.g., originator 182) and issuance of a BA (e.g., BlockAck 194) that are performed within a current transmit opportunity (TXOP) (e.g., as indicated by TXOP Start 196 and TXOP End 198). In one embodiment, BAR-BA exchange 190 is performed within the current TXOP to reduce recipient storage of receive state information for received data frames by enabling the recipient to discard the receive state information subsequent to termination of the TXOP. As indicated by item 199, storage requirements of the recipient 184, for maintaining receive state information of issued data frames to enable the immediate BA mechanism, are reduced by limiting a recipient to having, at most, one BA bitmap (for storage of the receive state information) per transmit identifier (TID). Although illustrated in FIG. 3 as media access control (MAC) protocol data units (MPDUs) of QoS data, the embodiments described herein are not limited to MPDU QoS data and may be used for other like frame formats or packet formats, such as non-QoS MPDUs or other like packet format.

As shown in FIG. 3, the BA exchange 190 is performed by issuing a BA request (BAR) 192 prior to termination of the current TXOP (TXOP END) 198. In response, the recipient issues BA 194 to complete the BAR-BA exchange 190. To provide an acknowledgement for the entire block of data frames requires recipient 182 to maintain some sort of state information, such as, for example, a BA bitmap with a starting sequence number (SSN) and bit marking each received data frame. As shown in FIG. 3, the process is under the control of originator 182, which decides when data frames are sent and when the BAR-BA exchange 190 is performed to receive an immediate BA 194 from recipient 184.

Supporting the immediate BA mechanism requires that recipient 184 maintain a BA bitmap per BA agreement. As described herein, a "BA agreement" may refer to an agreement between an originator and a recipient to require the recipient to issue an immediate BA in response to a BAR issued by the originator. The storage requirements in a device are determined by the maximum number of active BA sessions. Up to 16 (maximum number of traffic identifier (TID)) sessions may be active between any two stations. The maximum number of peer stations is almost unlimited, although in practice, some limit is chosen based on the expected usage. The storage requirements are thus:

$$\#BITMAP = (\#TA * \#TID) \qquad (1)$$

Accordingly, since a recipient must respond immediately to a BAR 192 with a BA 194 to complete BAR-BA exchange 190, these bitmaps must be stored in low latency, on-chip memory. Accordingly, in one embodiment, as shown in FIG. 3, the behavior of originator 182 is restricted to require originator to issue the BAR 192 prior to termination of a transmit opportunity (TXOP END) 198. Accordingly, as shown in FIG. 3, originator 182 is constrained to limit the information that is returned in an immediate BA 194. By restricting the behavior of originator 182, recipient 184 is allowed to reduce low latency, on-chip memory requirements, while maintaining a single scoreboard or BA bitmap (or a fixed number of scoreboards) and re-use the BA bitmap for different BA sessions. In one embodiment, the storage requirements may be reduced to:

$$\text{BitMap(per } TID \text{ bitmap)} = \#TID \qquad (2)$$

Figure 4:
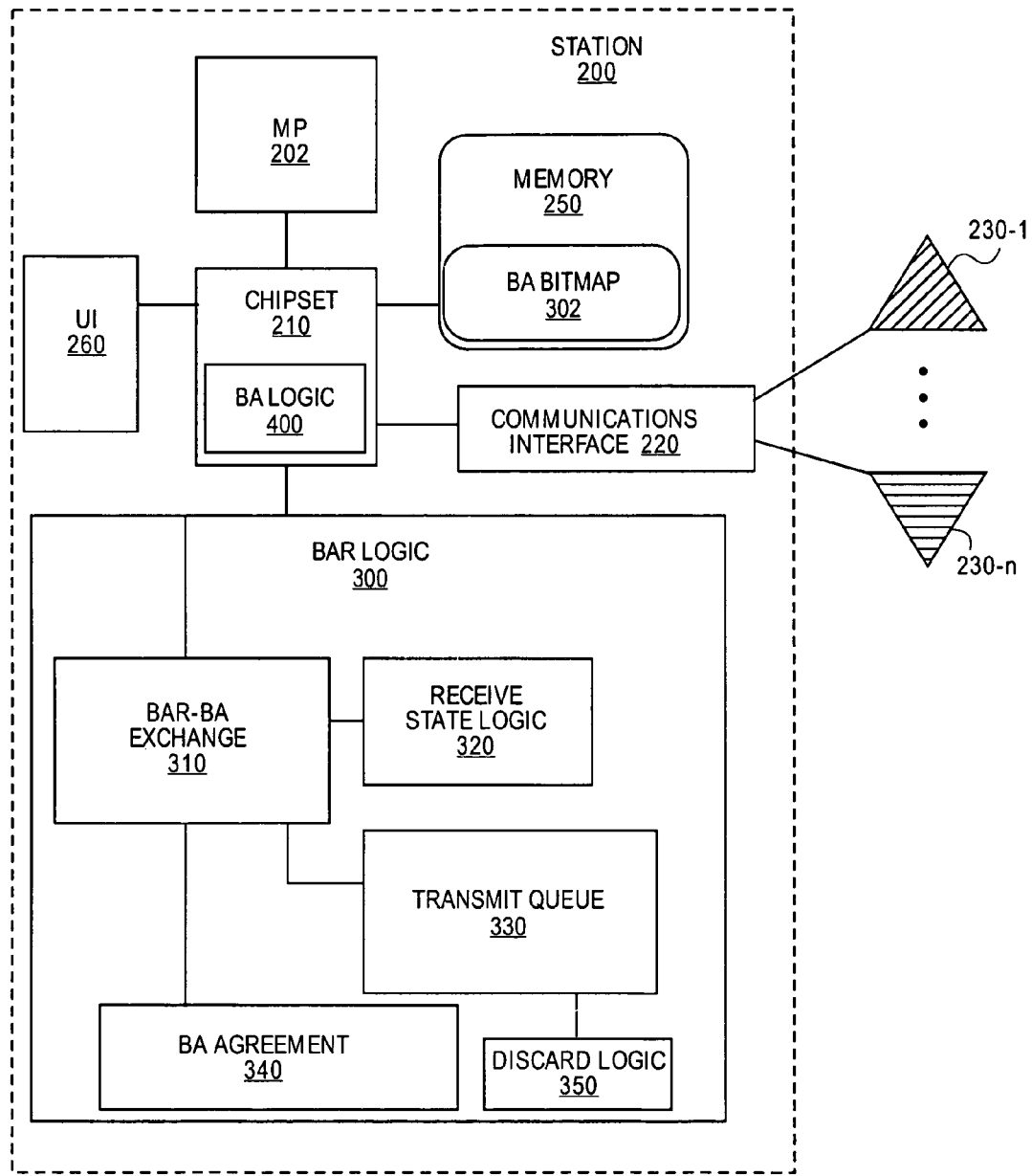
FIG. 4 is a block diagram illustrating a wireless configuration to provide block ACK with a reduced recipient state information, in accordance with one embodiment.

FIG. 4 is a block diagram illustrating originator station 200 to support an immediate BA mechanism with reduced recipient state, in accordance with one embodiment. Representatively, station 200 may include a microprocessor 202, which uses chipset 210 to access on-chip state memory 250, as well as communications interface 220. In one embodiment, memory 250 includes, but is not limited to random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data. As described herein, the term "chipset" is used in a manner well know to those of ordinary skill in the art to describe, collectively, the various devices coupled to CPU 202 to perform desired system functionality.

In one embodiment, communications interface 220 is, for example, a wireless Physical Layer, which operates according to a multiple input/multiple output (MIMO) operation. In accordance with such an embodiment, station 200 includes multiple transmit and receive antennas 230 (230-1, ..., 230-N). Representatively, station 200 provides multiple TX antennas and in one embodiment, includes block acknowledgement request BAR 300 for support an immediate BA mechanism with reduced recipient state level. In one embodiment, MAC layer functionality is provided by chipset 210 and BAR logic 300 and PHY layer functionality is provided by communication interface 220.

Accordingly, in the embodiment illustrated in FIG. 4, block acknowledgement request (BAR) logic 300 restricts originator behavior as shown in FIG. 3. As illustrated, BAR logic 300, following establishing of a BA session (entering into BA agreement using BA agreement logic 340) between a recipient and an originator, monitors the originator's transmission of a burst of frames to a recipient address (RA) for a single traffic identifier (TID). In accordance with such an embodiment, BAR logic 300 restricts the originator to require the originator to transmit a block acknowledgement request (BAR) before the end of the current transmit opportunity (TXOP).

In one embodiment, BAR-BA exchange logic 310 requires originator station 200 to initiate a BAR-BA exchange within a current TXOP. As shown in FIG. 3, transmission of a block of data frames 186 may begin within a polled TXOP or by contended channel access, such as, for example, an enhanced distributed channel access (EDCA) contention (TXOP Start 196). As shown in FIG. 3, a TXOP Start 196 is detected by originator 182. Once detected, a BA session begins with the originator issuing MPDU data block 186 of QoS data frames 188.

Referring again to FIG. 4, BAR-BA exchange logic 340 monitors the TXOP to ensure that originator station 200 issues the BAR prior to termination of the TXOP. Once the BAR is issued to the recipient, receive state logic 320 determines a received state of each of the frames transmitted to the recipient, according to, for example, a BA control frame received from the recipient, including, for example, a BA bitmap. In response to the received BA, a state of transmit queue 330 may be updated to retransmit unacknowledged frames. However, for acknowledged frames, discard logic 350 may discard acknowledged frames.

As shown in FIG. 4, station 200 is shown as operating as an originator station within a BA session. In the embodiment illustrated, BAR logic 300 is shown separate from chipset 210. However, in the embodiments described, BAR logic 300 may be integrated within chipset 210 or implemented as firmware within station 200, while remaining within the scope of the embodiments, as defined by the appended claims. Likewise, BA logic 400, although shown as integrated within chipset 210, may be provided as a separate off-chip component, for example, as illustrated in FIG. 5, may be provided as firmware within station 220, while remaining within the scope of the embodiments described herein, as defined by the appended claims Representatively, as shown, chipset 210 may include BA logic 400 for situations where station 200 operates as a recipient station, for example, as shown in FIG. 5.

Figure 5:
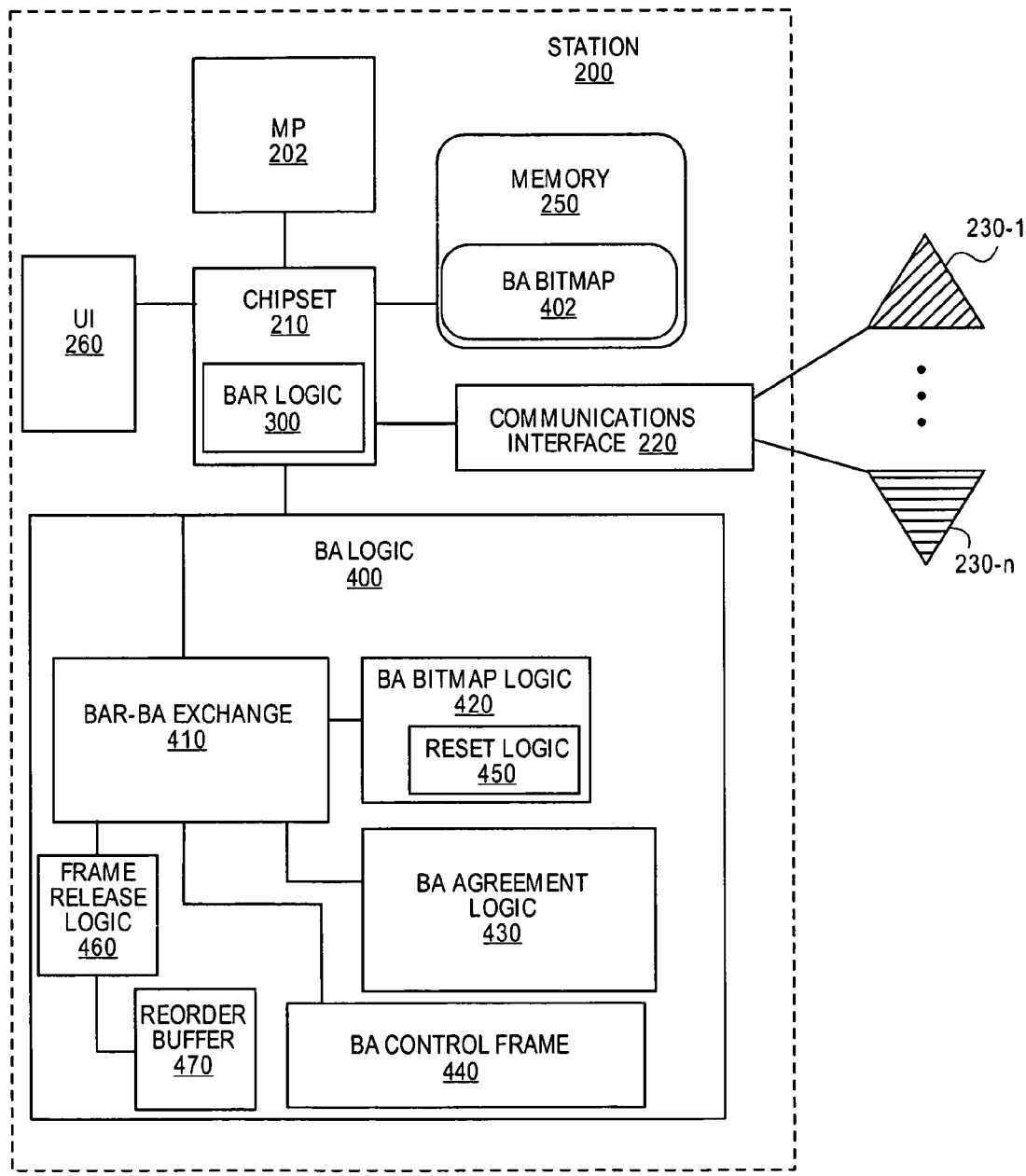
FIG. 5 is a block diagram further illustrating block ACK logic of FIG. 4, in accordance with one embodiment.

FIG. 5 is a block diagram of station 200, as shown in FIG. 4, to further illustrate BA logic 400 with BAR logic 300, as shown in FIG. 4, implemented within chipset 210, according to one embodiment. Representatively, BA agreement logic 430, establishes a BA agreement with an originator. Once established, BA bitmap logic 420 may maintain receive state information for received data frames within BA bitmap 402 for a single transmitter address (TA) and traffic identifier (TID) at any one time. Upon receipt of a data frame, BA bitmap logic 420 checks a TA and TID of the received data frame against BA bitmap 402. If a match is detected, BA bitmap logic 420 marks BA bitmap 402 for the received data frame.

In one embodiment, reset logic 450 may reset BA bitmap 402 and reuse BA bitmap 402 if a match is not detected between the TA and TID of the received data frame and the TA and TID of BA bitmap 402. Upon receipt of a BAR issued by an originator, BAR-BA logic 410 may compare a TA and TID of the received BAR against BA bitmap 402. If a match is detected, BAR-BA exchange logic 460 may request BA control frame logic 440 to issue a BA control frame to the originator, including BA bitmap 402.

In one embodiment, BA control frame logic 440 includes shift logic (not shown) to shift BA bitmap 402 according to a starting sequence number (SSN) detected from the BAR received from the originator. Otherwise, BA control frame logic 440 may respond with a null BA, which is, for example, a BA including all zero values. Upon receipt of the BAR, in one embodiment, frame release logic 410 may determine whether a continuous sequence of data frames started from the SSN are available within, for example, reorder buffer 470. When such is the case, frame release logic 460 may release the continuous sequence of received data frames from reorder buffer 470.

Figure 6:
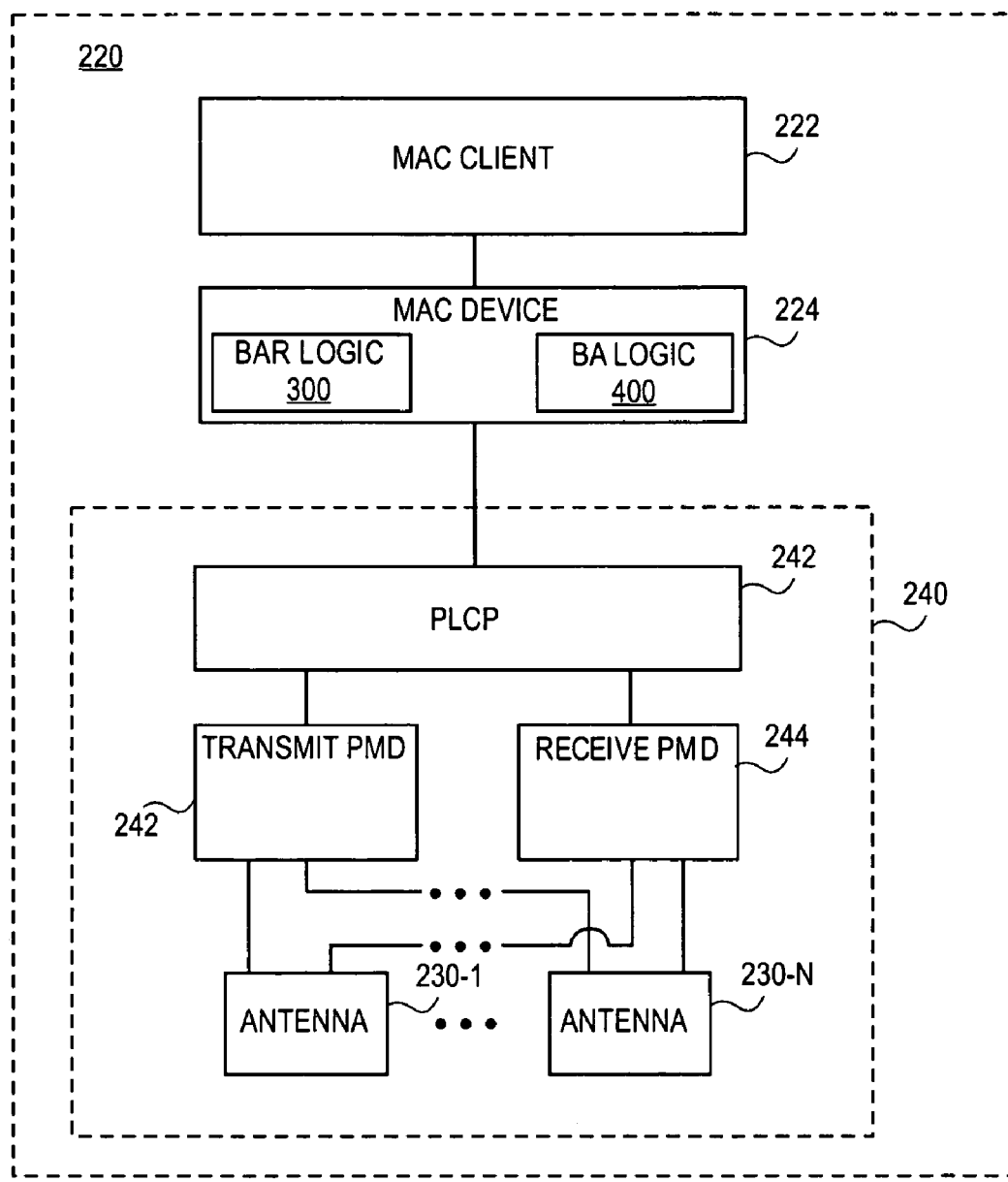
FIG. 6 is a block diagram further illustrating the communications interface of FIGS. 4 and 5, in accordance with one embodiment.

FIG. 6 is a simplified block diagram further illustrating communications interface 220 (e.g., stations, as shown in FIGS. 4 and 5) in accordance with one embodiment. Any WLAN station 200 may provide support for IEEE 802.11 Standard by including a physical layer (PHY) signaling control device (PHY device) 240, a medium access control (MAC) device 224, and a MAC client 222. In one embodiment, the function of MAC device 224 may be modified to operate according to BAR logic 300 (FIG. 4) and BA logic 400 (FIG. 5) to support the immediate BA mechanism with a reduced recipient state.

The MAC client 222 creates and processes data, among other things. The purpose of the PHY and MAC devices 240, 224 is to ensure that two network stations are communicating with the correct frame format and protocol. An IEEE Std. 802.11 defines the communication protocol between network stations.

The function of the PHY device 240 is threefold: 1) to provide a frame exchange between the MAC 224 and PHY 240 under the control of a physical layer convergence procedure (PLCP) sublayer; 2) to transmit data frames over the air interface under the control of the physical medium dependent (PMD) sublayer; and 3) to provide a carrier sense indication back to the MAC 224 so the MAC 224 is able to verify activity on the air interface. In one embodiment, PHY device is modified to provide a combined rate and TX antenna selection mechanism.

In general, the PHY device 240 includes PLCP apparatus 242, and transmit and receive PMD apparatuses 242, 244. Each of these may or may not use some or all of the same physical circuitry (e.g., processors, busses, clocks, storage, etc.). In addition, a plurality of antennas 230 (230-1, . . . , 230-N) may be interconnected with PMD apparatus 242, 244.

Figure 7:
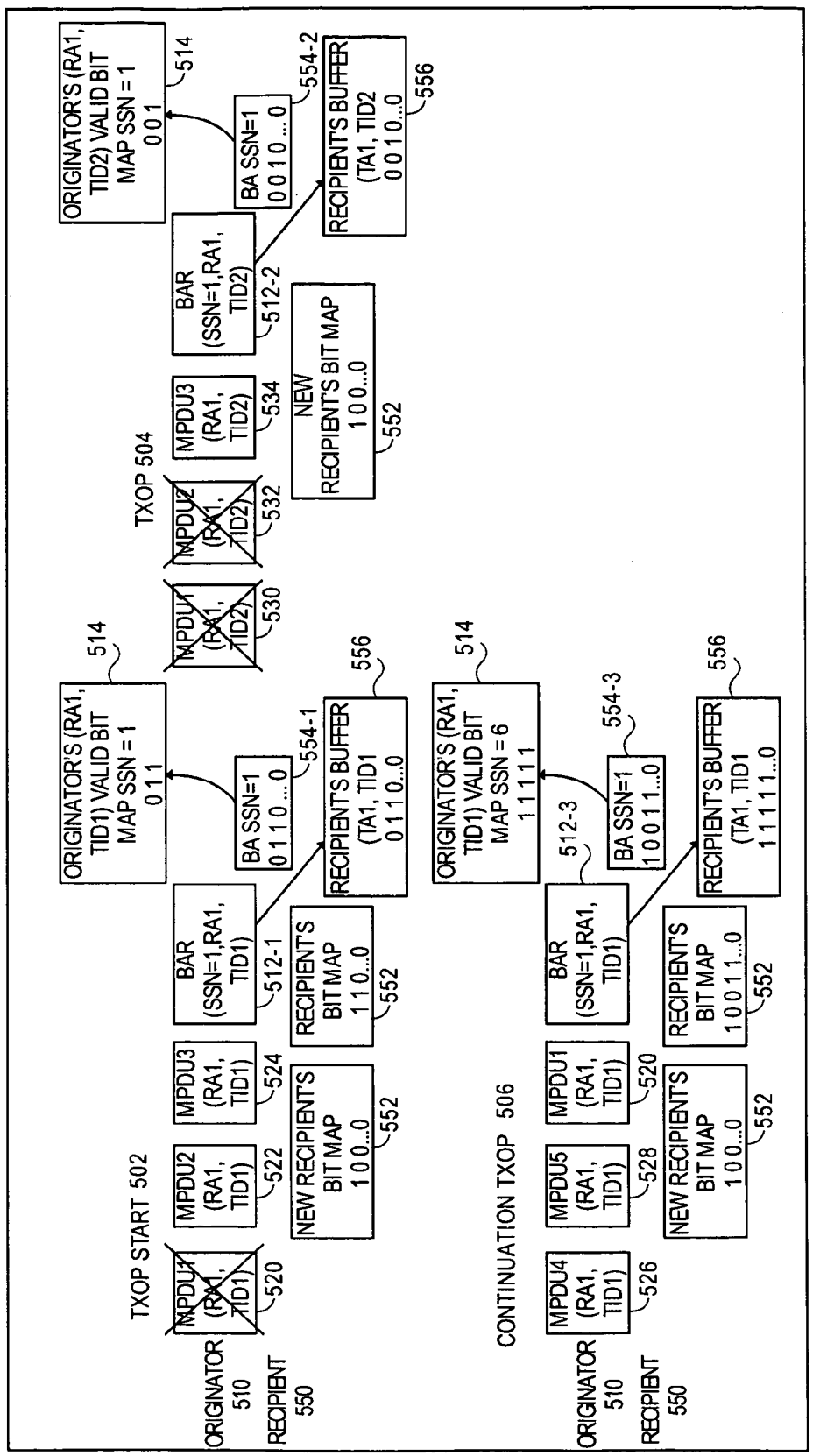
FIG. 7 is a state flow diagram illustrating a block ACK request and block ACKs with reduced recipient state information, in accordance with one embodiment.

FIG. 7 is a block diagram illustrating a reduced recipient state flow 500, in accordance with one embodiment. As illustrated, originator 510 and recipient 550 have entered into a BA agreement and during a BA session, originator 510 issues a sequence MAC protocol data unit (MPDU) blocks of QoS data frames 520, 522 and 524 during TXOP 502 to RA1 and TID1. Once issued and prior to termination of TXOP 502, originator 502 issues BAR 512 to recipient 550. As illustrated, data frames 522 and 524 are received by recipient 550 but data frame 520 is not received. Accordingly, the recipient's BA bitmap 552 illustrates receipt of data frames 522 and 524.

Representatively, recipient 550 only receives frames 522 and 524; therefore in BA bitmap 552, the first up to date bit is related to frame 522. In the time the recipient 550 receives BAR 512-1, the bits related to frames 522 and 524 are set in BA bitmap 552. Upon receipt of BAR 512-1 with SSN=1, recipient 550 checks BA bitmap 552 and recognizes that frame 520 does not succeed and answers with the related BA control frame 554-1 that acknowledges frames 522 and 524. In parallel, recipient 550 checks the reordering buffer 556 and sees that there is no sequence that can be released. Upon receipt of BA control frame 554-1, the originator updates its own bitmap 514 related to the particular RA1/TID1 with success of frame 522 and frame 524 and remembers that the frame 520 should be retransmitted.

In next transmit opportunity 504, originator 510 starts to send data frames 530, 532 and 534 to RA1 and TID2. Recipient 550 receives only frame 534, as shown, frames 530 and 532 are not received. At this point, recipient 550 recognizes that the TID (TID2) differs from the former (TID1) and therefore resets the memory allocated for bitmap 552 and starts the new bitmap 552 related to new TID2 in the same location. The BAR-BA exchange behavior of originator 510 and recipient 550 may be the same as described for TID1. In one embodiment, originator 510 has separate resources for bitmap 514, as well as for actual data frames per RA/TID; recipient 550 has separate reordering buffers 556 for data frames per TA/TID, but may include only single shared resource for bitmap 552.

In the next transmit opportunity 506, the originator 510 resumes transmission to the TID1. Representatively, the frames (526, 528, 520) are issued out of order with frames 526 and 528 issued prior to retransmission of frame 520. At the first received frame 526, the recipient 550 recognizes that the TID differs from the last one, resets the memory and starts to build bitmap 552 related to TID1. The recipient 550 successfully receives all sent frames 526, 528 and 520.

Representatively bitmap 552 reflects the success of frames 520, 526 and 528 with numbers 1, 4 and 5, respectively. This bitmap 552 does not contain the former success of frames 522 and 524. The BAR 512-3 issued by the originator 510 repeats the former SSN=1 and the recipient 550 responds with BA 554-3 that acknowledges the frames 520, 526 and 528. The bitmap 552 contained in BA control frame 554-3 actually is an increment of the last sent bitmap 552. After getting this BA 552, the resulting bitmap 514 stored by the originator 510 will contain continuous sequences of frames from 1 until 5, thus allowing shifting the SSN to 6.

At getting BAR 512-3, the recipient 550 goes to check its reordering buffer 556 per related TA/TID. It now contains a continuous sequence of frames from 1 until 5, thus enabling releasing of frames 520-528 to upper layers and freeing the related buffers. The originator 510 also releases the related frames and buffers. Representatively, FIG. 7 may demonstrate how the method for immediate BA mechanism with reduced recipient state information succeeds to deliver MPDU frames 520-528; however, the related bitmap 552 is reset in the middle of the BA session and used by another flow. Procedural methods for implementing one or more embodiments are now described.

Operation

Turning now to FIG. 8, the particular methods associated with embodiments of the invention are described in terms of computer software and hardware with reference to a flowchart. The methods to be performed by a computing device (e.g., a wireless station) may constitute state machines or computer programs made up of computer-executable instructions. The computer-executable instructions may be written in a computer program and programming language or embodied in firmware logic. If written in a programming language conforming to a recognized standard, such instructions can be executed in a variety of hardware platforms and for interface to a variety of operating systems.

In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 8 is a flowchart illustrating a method 600 for block acknowledgements with reduced recipient state information, in accordance with one embodiment. In the embodiments described, examples of the described embodiments will be made with reference to FIGS. 1-7. However, the described embodiments should not be limited to the examples provided to limit the scope of the various embodiments, as defined by the appended claims.

Referring again to FIG. 8, at process block 610, an originator may request a BA agreement with a recipient. Once requested, it is determined, at process block 620, whether the BA agreement is accepted. Once accepted, the originator may engage in a BA session by detecting a TXOP at process block 630. Once detected, the originator may transmit a block of data frames to the recipient. Once transmitted, at process block 650, the originator issues a BAR to the recipient to request an immediate BA. Once requested, at process block 660, it is determined whether the originator has received a BA control frame. Once received, at process block 670, the originator may update a transmit (TX) queue state according to a BA bitmap received with the control frame. Based on the BA bitmap, the originator may retransmit unacknowledged frames and discard acknowledged frames.

Corresponding behavior of a recipient is shown in the flowchart of FIG. 9 to illustrate a method 710 for an immediate BA mechanisms with a reduced recipient state, in accordance with one embodiment. At process block 710, the recipient determines whether a block agreement request is received. Once received, at process block 720, the recipient may accept the BA agreement. Once accepted, at process block 730, the recipient may issue acceptance of a BA agreement to the originator.

In one embodiment, the establishment of a BA agreement, as illustrated by process blocks 710-730 and corresponding process blocks 610 and 620 of FIG. 8, may be performed by exchanging an add BA (ADDBA) request and response frames. Specifically, the originator issues an ADDBA request to the recipient, which is acknowledged by the recipient. Subsequent to such acknowledgement, the recipient may send an ADDBA response frame to the originator, which may either accept or reject the BA agreement. Receipt of such ADDBA response frame is acknowledged by the originator to the recipient to establish a BA agreement.

Referring again to FIG. 9, at process block 740, a BA agreement has been established and now the recipient determines whether a block of frames is received. As the block of frames is received, at process block 750, the recipient may update a BA bitmap for received data frames. Once updated, at process block 760, it is determined whether a BAR s received from the originator. Once received, at process block 770, the recipient determines whether the BAR was received during the current TXOP. If received during the current TXOP, at process block 780, the recipient may issue the BA bitmap to the originator within a BA control frame. Once transmitted, at process block 790, the recipient is able to reduce recipient state information by resetting the BA bitmap, once the BA control frame is acknowledged by the originator. Accordingly, since the originator is responsible for maintaining the receive state information once the originator has received the BA control frame, including a receive state of each of the data frames issued to the recipient during the current TXOP, the recipient is no longer responsible for such information.

Accordingly, in the embodiments illustrated, for example, as shown in FIGS. 4 and 5, one embodiment of the immediate BA mechanism, as described herein, may provide a reduced recipient state by using a single resource for the recipient BA bitmap, irrespective of the number of active BA sessions the recipient maintains. As the result of the use of a single resource for the recipient bitmap, significantly fewer memory resources may be required within local memory, as compared to the unconstrained immediate BA mechanism, for example, as described by 802-11e. Due to the reduced local memory requirements, wireless devices, which implement the immediate BA mechanism, as described herein, may be manufactured with a significantly reduced product cost.

Accordingly, in the embodiments described with reference to FIGS. 4 and 5, recipient station 200 contains a single resource for storing and maintaining a BA bitmap that is used for any BA agreements of the recipient station. In one embodiment, the BA bitmap may be reset in response to recipient station detection of a change of TA/TID according to a received data frame. To support the immediate BA mechanism with a reduced recipient state, the originator may maintain a BA bitmap in an incremental manner storing untouched fields related to formerly acknowledged MPDUs and updating only fields relating to new acknowledged MDPUs regarding the particular RA/TID combination.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Having disclosed embodiments and the best mode, modifications and variations may be made to the disclosed embodiments while remaining within the scope of the embodiments as defined by the following claims.

What is claimed is:

1. A method of generating an immediate block acknowledgement by a recipient station via partial state operation, comprising:
  receiving a data unit associated with a block acknowledgement agreement between an originator station and the recipient station;
  generating and storing a temporary block acknowledgement record if no temporary block acknowledgement record for the agreement exists when the data unit is received;
  modifying the temporary block acknowledgement record based on the received data unit if the temporary block acknowledgement record for the agreement exists when the data unit is received;
  generating the immediate block acknowledgement for the originator station based on the temporary block acknowledgement record; and
  discarding the temporary block acknowledgement record when a data unit is received from a different originator station.

2. The method of claim 1, wherein the temporary block acknowledgement record includes a bitmap.

3. The method of claim 1, wherein the data unit associated with the block acknowledgement agreement includes a media access control (MAC) protocol data unit (MPDU).

4. The method of claim 1, further comprising:
  responding to the originator station to establish the block acknowledgement agreement.

5. The method of claim 1, further comprising:
  receiving a block acknowledgement request from the originator station; and
  transmitting the immediate block acknowledgement to the originator station in response to the block acknowledgement request.

6. A method of managing an immediate block acknowledgement scoreboard by a recipient station during partial state operation, comprising:
  receiving a data unit associated with a first block acknowledgement agreement between the recipient station and a first originator station;
  generating and storing a temporary block acknowledgement record if no temporary block acknowledgement record for the first block acknowledgement agreement exists when the data unit is received;
  modifying the temporary block acknowledgement record based on the received data unit if the temporary block acknowledgement record for the first block acknowledgement agreement exists when the data unit is received;

receiving another data unit associated with a second block acknowledgement agreement between the recipient station and a second originator station that is different from the first originator station; and discarding the temporary block acknowledgement record after receiving the another data unit from the second originator station.

7. The method of claim 6, wherein the temporary block acknowledgement record includes a bitmap.

8. The method of claim 6, wherein the data unit associated with the first block acknowledgement agreement includes a media access control (MAC) protocol data unit (MPDU), and wherein the another data unit associated with the second block acknowledgement agreement includes another MPDU.

9. The method of claim 6, further comprising:
generating an immediate block acknowledgement for the first originator station based on the temporary block acknowledgement record.

10. The method of claim 6, further comprising:
receiving a block acknowledgement request from the first originator station; and
transmitting an immediate block acknowledgement including the temporary block acknowledgement record to the first originator station in response to the block acknowledgement request.

11. A method of managing an immediate block acknowledgement scoreboard by a recipient station during partial state operation, comprising:

generating and storing in a memory a temporary block acknowledgement record for a block acknowledgement agreement between an originator station and the recipient station;

maintaining the temporary block acknowledgement record as long as the recipient station receives data from the originator station; and discarding the temporary block acknowledgement record when the recipient station receives data from a different station than the originator station.

12. The method of claim 11, wherein the temporary block acknowledgement record includes a bitmap.

13. The method of claim 11, wherein the data from the originator station includes a media access control (MAC) protocol data unit (MPDU), and
wherein the data from the different station includes another MPDU.

14. The method of claim 11, further comprising:
responding to the originator station to establish the block acknowledgement agreement.

15. The method of claim 11, further comprising:
receiving a block acknowledgement request from the originator station; and
transmitting the immediate block acknowledgement including the temporary block acknowledgement record to the originator station in response to the block acknowledgement request.

16. The method of claim 11, wherein the maintaining includes:
modifying the temporary block acknowledgement record based on the received data from the originator station.

\* \* \* \* \*